US012589771B2

(12) United States Patent
Sugimoto et al.

(10) Patent No.: US 12,589,771 B2
(45) Date of Patent: Mar. 31, 2026

(54) VEHICLE CONTROL DEVICE, STORAGE MEDIUM FOR STORING COMPUTER PROGRAM FOR VEHICLE CONTROL, AND METHOD FOR CONTROLLING VEHICLE

(71) Applicant: TOYOTA JIDOSHA KABUSHIKI KAISHA, Toyota (JP)

(72) Inventors: Sota Sugimoto, Tokyo-to (JP); Jumpei Kiriki, Tokyo-to (JP)

(73) Assignee: TOYOTA JIDSOHA KABUSHIKI KAISHA, Toyota (JP)

( * ) Notice: Subject to any disclaimer, the term of this patent is extended or adjusted under 35 U.S.C. 154(b) by 216 days.

(21) Appl. No.: 18/159,454

(22) Filed: Jan. 25, 2023

(65) Prior Publication Data

US 2023/0391370 A1 Dec. 7, 2023

(30) Foreign Application Priority Data

Jun. 1, 2022 (JP) ................................ 2022-089800

(51) Int. Cl.
| | |
|---|---|
| B60W 60/00 | (2020.01) |
| B60W 30/18 | (2012.01) |
| B60W 40/08 | (2012.01) |

(52) U.S. Cl.
CPC ...... B60W 60/0015 (2020.02); B60W 30/181 (2013.01); B60W 40/08 (2013.01); B60W 2420/403 (2013.01)

(58) Field of Classification Search
CPC ........... B60W 60/0015; B60W 30/181; B60W 40/08; B60W 2420/403; B60W 50/14; B60W 2540/10; B60W 2540/12; B60W 2540/18; B60W 2540/223; B60W 2540/225; B60W 2540/26; B60W 60/007; B60W 2552/00; B60W 2556/40; B60W 2556/50
See application file for complete search history.

(56) References Cited

U.S. PATENT DOCUMENTS

2013/0311043 A1 11/2013 Kobana et al.
2015/0345964 A1 12/2015 Oooka et al.
(Continued)

FOREIGN PATENT DOCUMENTS

JP 2015-228090 A 12/2015
JP 2016-18474 A 2/2016
(Continued)

OTHER PUBLICATIONS

Kiriki, Jumpei et al., "Development of an Emergency Stop Assist System with Pull-Over Function," SAE Int. J. Advances & Curr. Prac. in Mobility 4(6):2389-2395, 2022, doi:10.4271/2022-01-0061, Mar. 29, 2022.

*Primary Examiner* — Navid Z. Mehdizadeh
*Assistant Examiner* — Caitlin R Mccleary
(74) *Attorney, Agent, or Firm* — Oliff PLC

(57) ABSTRACT

A vehicle control device has a processor that is configured to determine whether or not a non-controllable point where automatic control of vehicle travel is not allowed exists in a predetermined range from a current location of a vehicle on a path ahead of the vehicle, when it has been determined that there is a problem with a driver, and to set a vehicle stop location where the vehicle can stop at a location before the non-controllable point, when it has been determined that the non-controllable point exists.

5 Claims, 5 Drawing Sheets

(56) References Cited

U.S. PATENT DOCUMENTS

| | | | |
|---|---|---|---|
| 2017/0259832 A1* | 9/2017 | Lathrop | G05D 1/0061 |
| 2019/0018413 A1* | 1/2019 | Wood | G05D 1/0088 |
| 2020/0307633 A1* | 10/2020 | Naruse | B60W 60/0059 |
| 2020/0307646 A1* | 10/2020 | Kato | B60W 50/00 |
| 2021/0197832 A1 | 7/2021 | Matsunami | |
| 2021/0206396 A1* | 7/2021 | Carbaugh | B60W 60/00184 |
| 2022/0063635 A1* | 3/2022 | Kim | B60W 40/09 |
| 2022/0161813 A1 | 5/2022 | Oba | |
| 2023/0140569 A1* | 5/2023 | Foster | B60W 60/0017 |
| | | | 701/400 |
| 2023/0204386 A1 | 6/2023 | Kitahara et al. | |
| 2024/0071150 A1* | 2/2024 | Poeppel | G06Q 10/0631 |

FOREIGN PATENT DOCUMENTS

| | | | |
|---|---|---|---|
| JP | 2016-45856 A | 4/2016 |
| JP | 2019-199178 A | 11/2019 |
| WO | 2012/105030 A1 | 8/2012 |
| WO | 2020213280 A1 | 10/2020 |
| WO | 2022/054712 A1 | 3/2022 |

* cited by examiner

FIG. 2

VEHICLE CONTROL DEVICE, STORAGE MEDIUM FOR STORING COMPUTER PROGRAM FOR VEHICLE CONTROL, AND METHOD FOR CONTROLLING VEHICLE

FIELD

The present disclosure relates to a vehicle control device, a storage medium storing a computer program for vehicle control, and a method for controlling a vehicle.

BACKGROUND

An automatic control system mounted in a vehicle creates a navigation route for the vehicle based on the current location of the vehicle, the destination location of the vehicle, and a navigation map. The automatic control system estimates the current location of the vehicle using the map information and controls the vehicle to travel along the navigation route.

The automatic control system controls traveling of the vehicle so that a safe distance is maintained between the vehicle and other vehicles. When a safe distance cannot be maintained between the vehicle and another vehicle by automatic control, operation of the vehicle is switched from automatic control to manual control, transferring control of the vehicle to the driver.

The automatic control system also controls the vehicle to stop when a problem has occurred with the driver (see Japanese Unexamined Patent Publication No. 2015-228090, for example). This is because in such a situation it is no longer possible to switch control of the vehicle to the driver when a safe distance cannot be maintained between the vehicle and another vehicle by automatic control.

SUMMARY

An automatic control system has "non-controllable points" where control of the vehicle is not allowed. The non-controllable points include, for example, points where high precision map information to be used to estimate the location of the vehicle is not available, and points where the automatic control system cannot safely control the vehicle, such as on roads with a low curvature radius.

When there is a problem with the driver before a non-controllable point, it may not be possible to safely stop the vehicle if the vehicle is to stop in the non-controllable point.

It is an object of the present disclosure to provide a vehicle control device that can safely stop a vehicle when there is a problem with the driver.

One embodiment of the invention provides a vehicle control device. The vehicle control device has a determining unit that determines whether or not a non-controllable point where automatic control of vehicle travel is not allowed exists in a predetermined range from a current location of a vehicle on a path ahead of the vehicle, when it has been determined that there is a problem with a driver, and a setting unit that sets a vehicle stop location where the vehicle can stop at a location before the non-controllable point, when it has been determined by the determining unit that the non-controllable point exists.

In this vehicle control device, it is preferable that the setting unit sets the vehicle stop location to allow a limit for a state of the vehicle as the vehicle travels from the current location of the vehicle to the vehicle stop location to exceed the limit that is allowed when it has been determined that there is no problem with the driver, when it has been determined that there is a problem with the driver.

In this vehicle control device, it is preferable that the non-controllable point includes a point that is curved with a smaller curvature radius than a predetermined reference curvature radius or a point having a larger gradient than a predetermined reference gradient.

In this vehicle control device, it is preferably determined whether or not there is a problem with the driver based on a monitor image representing an area near a driving seat of the vehicle.

According to another embodiment, a non-transitory storage medium storing a computer program for vehicle control is provided. The computer program for vehicle control causes a processor execute a process and the process includes determining whether or not a non-controllable point where automatic control of vehicle travel is not allowed exists in a predetermined range from a current location of a vehicle on a path ahead of the vehicle, when it has been determined that there is a problem with a driver, and setting a vehicle stop location where the vehicle can stop at a location before the non-controllable point, when it has been determined that the non-controllable point exists.

Yet another embodiment of the invention provides a method for controlling a vehicle that is carried out by a vehicle control device. The method for controlling a vehicle includes determining whether or not a non-controllable point where automatic control of vehicle travel is not allowed exists in a predetermined range from a current location of a vehicle on a path ahead of the vehicle, when it has been determined that there is a problem with a driver and setting a vehicle stop location where the vehicle can stop at a location before the non-controllable point, when it has been determined that the non-controllable point exists.

The vehicle control device of the disclosure can safely stop a vehicle when there is a problem with the driver.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 2 is a general schematic drawing of a vehicle in which a vehicle control system of the embodiment is mounted.

DESCRIPTION OF EMBODIMENTS

Figure 1:
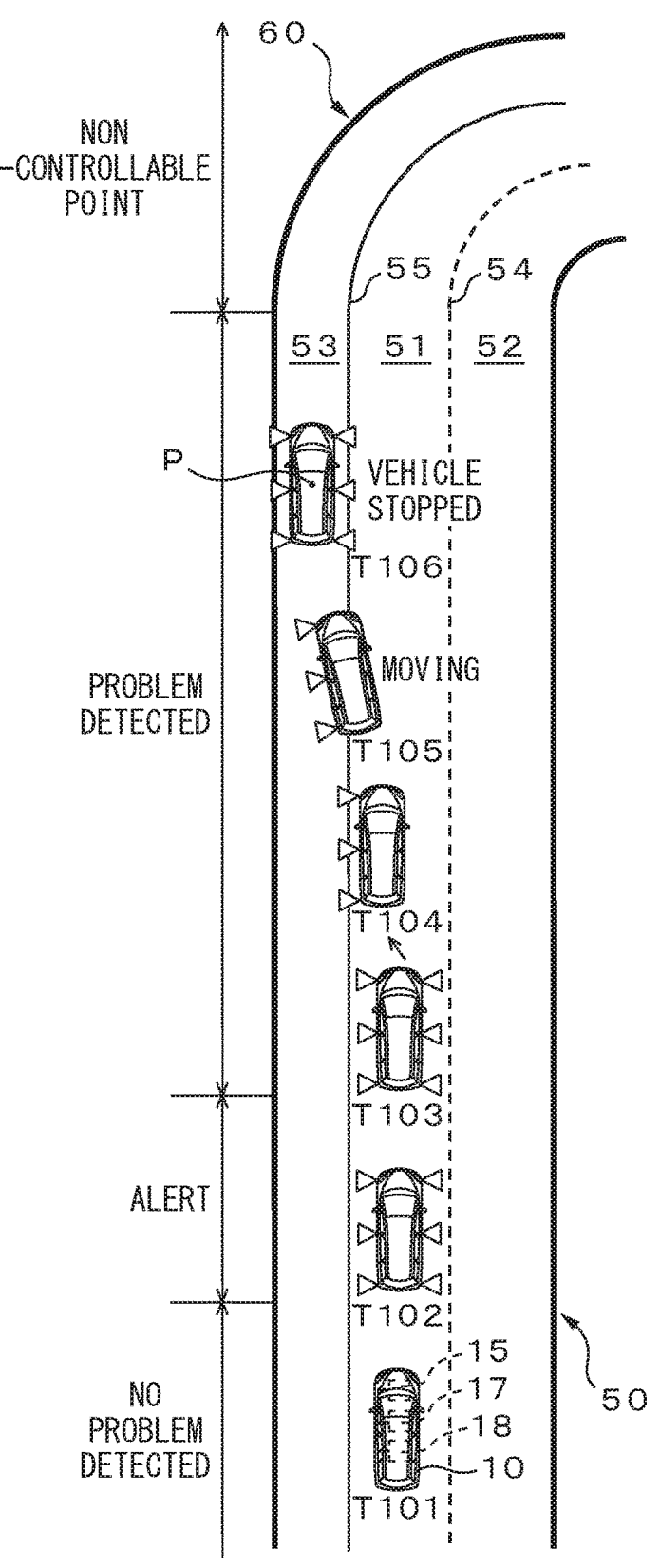
FIG. 1 is a diagram illustrating operation of a vehicle stopping device of the embodiment in overview.

FIG. 1 is a diagram illustrating operation of a vehicle stopping device 18 of the embodiment in overview. Operation relating to vehicle control processing by the vehicle stopping device 18 disclosed herein will now be described in overview with reference to FIG. 1.

In the example shown in FIG. 1, the vehicle 10 is traveling on a road 50. The road 50 has two lanes 51, 52 and a shoulder 53. The two traffic lanes 51 and 52 are divided by a lane marking line 54, and the traffic lane 51 and shoulder 53 are divided by a lane marking line 55. The vehicle 10 is traveling on the traffic lane 51 which is adjacent to the shoulder 53.

The vehicle 10 has a monitoring device 17 that determines whether or not there is a problem with the driver, a vehicle stop planning device 18 that sets a vehicle stop location where the vehicle 10 is to stop when it has been determined that there is a problem with the driver, and a drive planning device 15 that creates a driving plan for the vehicle 10. The vehicle 10 may be an autonomous vehicle. The vehicle stop planning device 18 is an example of a vehicle control device.

In the example shown in FIG. 1, a problem with the driver was detected by the monitoring device 17 at time T102, and since activity related to operation by the driver was not detected after alerting the driver, the monitoring device 17 determines that there is a problem with the driver at time T103.

The vehicle stop planning device 18 determines whether or not a non-controllable point where automatic control of traveling of the vehicle 10 is not allowed exists in a predetermined range from the current location of the vehicle 10 on the path ahead of the vehicle 10. The non-controllable points include points where the vehicle 10 cannot be safely controlled by automatic control for reasons such as a small curvature radius.

Since a point that is curved with a smaller curvature radius than the predetermined reference curvature radius is present within a predetermined range on the path ahead of the vehicle 10, the vehicle stop planning device 18 determines that a non-controllable point 60 exists.

The vehicle stop planning device 18 sets a vehicle stop location P where the vehicle 10 can be stopped, at a location before the non-controllable point 60. In the example shown in FIG. 1, the vehicle stop planning device 18 sets the vehicle stop location P on the shoulder 53 before the non-controllable point 60.

The main operation of the vehicle 10 will usually be transferred to the driver at the non-controllable point 60, but main operation of the vehicle 10 cannot be transferred to the driver if there is a problem with the driver. The vehicle stop planning device 18 therefore sets a vehicle stop location P where the vehicle 10 can be stopped at a location before the non-controllable point 60, for stopping of the vehicle 10 by automatic control.

The vehicle stop planning device 18 makes a request to the drive planning device 15 to generate a driving plan to stop the vehicle 10 at a vehicle stopping location P. The drive planning device 15 then creates a driving plan to stop the vehicle 10 at the vehicle stop location P.

The drive planning device 15 of the vehicle 10 creates a driving plan for moving the vehicle 10 to the vehicle stop location P on the shoulder 53 and stopping it, and as a result the vehicle 10 changes traffic lanes at time T105 and stops at the vehicle stop location P at time T106.

As explained above, when there is a problem with the driver, the vehicle stop planning device 18 can safely stop the vehicle 10 before the non-controllable point 60.

Figure 2:
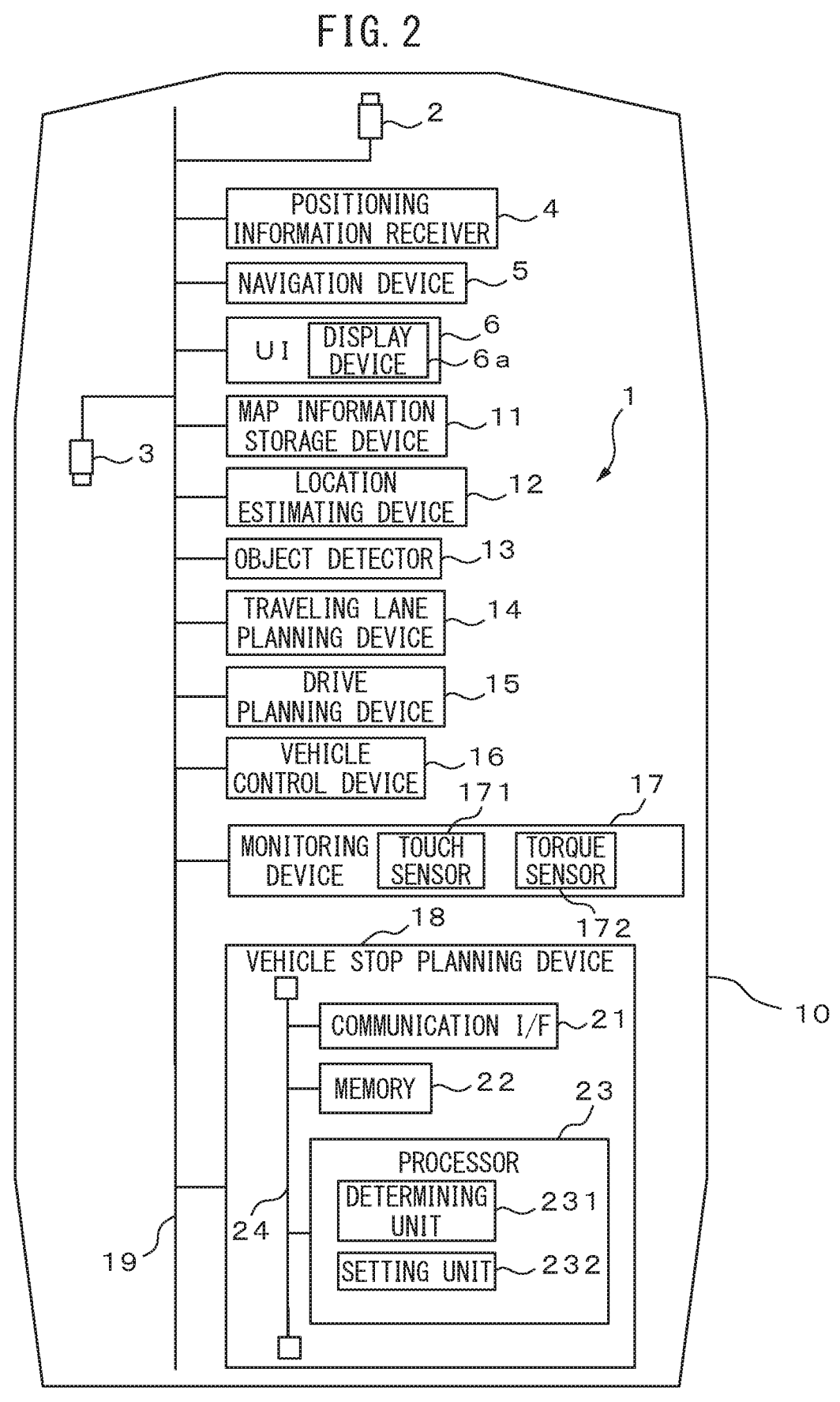

FIG. 2 is a general schematic drawing of a vehicle 10 in which a vehicle control system 1 of the embodiment is mounted. The vehicle 10 has a front camera 2, a monitoring camera 3, a positioning information receiver 4, a navigation device 5, a user interface (UI) 6, a map information storage device 11, a location estimating device 12, an object detector

13, a traveling lane planning device 14, a drive planning device 15, a vehicle control device 16, a monitoring device 17 and a vehicle stop planning device 18. The vehicle 10 may also have a LiDAR sensor, as a distance sensor (not shown) for measurement of the distance of the vehicle 10 to surrounding objects. The vehicle control system 1 has at least vehicle stop planning device 18.

The front camera 2, monitoring camera 3, positioning information receiver 4, navigation device 5, UI 6, map information storage device 11, location estimating device 12, object detector 13, traveling lane planning device 14, drive planning device 15, vehicle control device 16, monitoring device 17 and vehicle stop planning device 18 are connected in a communicable manner through an in-vehicle network 19 that conforms to controller area network standards.

The front camera 2 is an example of an imaging unit provided in the vehicle 10. The front camera 2 is mounted inside the vehicle 10 and directed toward the front of the vehicle 10. The front camera 2 takes a camera image in which the environment of a predetermined region ahead of the vehicle 10 is shown, at a camera image photograph time set with a predetermined cycle, for example. The camera image can show the road in the predetermined region ahead of the vehicle 10, and road features such as surface lane marking lines on the road. The front camera 2 has a 2D detector composed of an array of photoelectric conversion elements with visible light sensitivity, such as a CCD or C-MOS, and an imaging optical system that forms an image of the photographed region on the 2D detector.

Each time a camera image is taken, the front camera 2 outputs the camera image and the camera image photograph time through the in-vehicle network 19 to the location estimating device 12 and the object detector 13, etc. The camera image is also used for processing at the location estimating device 12 to estimate the location of the vehicle 10. At the object detector 13, the camera image is used for processing to detect other objects surrounding the vehicle 10.

The monitoring camera 3 is disposed in the vehicle compartment in a manner allowing it to photograph monitor images including the area near the driving seat. The monitor image also includes the face of the driver driving the vehicle 10. The monitoring camera 3 is an example of a photographing device that takes monitor images including the face of the driver. The monitoring camera 3 may also be disposed on the steering column, room mirror, meter panel or meter hood (not shown), etc., for example.

The monitoring camera 3 takes monitor images at monitor image photograph times set with a predetermined cycle, for example. The monitoring camera 3 has a 2D detector composed of an array of photoelectric conversion elements with infrared sensitivity, such as a CCD or C-MOS, and an imaging optical system that forms an image of the photographed region on the 2D detector. Each time a monitor image is taken, the monitoring camera 3 outputs the monitor image and monitor image photograph time to the monitoring device 17, etc. via the in-vehicle network 19.

The positioning information receiver 4 outputs positioning information that represents the current location of the vehicle 10. The positioning information receiver 4 may be a GNSS receiver, for example. The positioning information receiver 4 outputs positioning information and the positioning information acquisition time at which the positioning information has been acquired, to the navigation device 5 and map information storage device 11, etc., each time positioning information is acquired at a predetermined receiving cycle.

Based on the navigation map information, the destination location of the vehicle 10 input through the UI 6, and positioning information representing the current location of the vehicle 10 input from the positioning information receiver 4, the navigation device 5 creates a navigation route from the current location to the destination location of the vehicle 10. The navigation route includes information relating to the locations of right turns, left turns, merging and branching. When the destination location has been newly set or the current location of the vehicle 10 has exited the navigation route, etc., the navigation device 5 creates a new navigation route for the vehicle 10. Every time a navigation route is created, the navigation device 5 outputs the navigation route to the location estimating device 12, the traveling lane planning device 14 and the vehicle stop planning device 18, etc., via the in-vehicle network 19.

The UI 6 is an example of the notification unit. The UI 6 is controlled by the navigation device 5, drive planning device 15 and vehicle control device 16 to give the driver traveling information for the vehicle 10 and alerts for recommending active operation. The traveling information of the vehicle 10 includes information relating to the current location of the vehicle, executing of lane changes, and the current and future route of the vehicle, such as the navigation route. The UI 6 has a display device 6*a* such as a liquid crystal display or touch panel, for display of the traveling information. The UI 6 may also have an acoustic output device (not shown) to notify the driver of traveling information. The UI 6 also generates an operation signal in response to operation of the UI 6 by the driver. The operation information may be, for example, a destination location, transit points, vehicle speed or other control information. The UI 6 also has a touch panel or operating button, for example, as an input device for inputting operation information from the driver to the vehicle 10. The UI 6 outputs the input operation information to the navigation device 5, the drive planning device 15 and the vehicle control device 16, etc., via the in-vehicle network 19.

The map information storage device 11 stores wide-area map information for a relatively wide area (an area of 10 km² to 30 km², for example) that includes the current location of the vehicle 10. The map information preferably has high precision map information including three-dimensional information for the road surface, the speed limit for the road, the curvature radius of the road, the gradient of the road, and information for the types and locations of structures and road features such as road lane marking lines. The map information includes the locations of stop lines on the road, the number of lanes, the locations of motorway toll gates, and the locations of motorway service areas and parking areas. The map information also includes nonmatching positional information, for points where the road information in the map information differs from the actual road information.

The map information storage device 11 receives the wide-area map information from an external server via a base station, by wireless communication through a wireless communication device (not shown) mounted in the vehicle 10, in relation to the current location of the vehicle 10, and stores it in the storage device. Each time positioning information is input from the positioning information receiver 4, the map information storage device 11 refers to the stored wide-area map information and outputs map information for a relatively narrow area including the current location represented by the positioning information (for example, an area of 100 m² to 10 km²), through the in-vehicle network 19 to the location estimating device 12, object detector 13, traveling lane planning device 14, drive planning device 15, vehicle control device 16 and vehicle stop planning device 18, etc.

The location estimating device 12 estimates the location of the vehicle 10 at the camera image photograph time, based on the road features surrounding the vehicle 10 represented in the camera image taken by the front camera 2. For example, the location estimating device 12 compares lane marking lines identified in the camera image with lane marking lines represented in the map information input from the map information storage device 11, and determines the estimated location and estimated declination of the vehicle 10 at the camera image photograph time. The location estimating device 12 estimates the road traveling lane where the vehicle 10 is located, based on the lane marking lines represented in the map information and on the estimated location and estimated declination of the vehicle 10. Each time the estimated location, estimated declination and traveling lane of the vehicle 10 are determined at the camera image photograph time, the location estimating device 12 outputs this information to the object detector 13, traveling lane planning device 14, drive planning device 15, vehicle control device 16 and vehicle stop planning device 18, etc.

The object detector 13 detects other objects around the vehicle 10 and their types (for example, vehicles) based on the camera image. Other objects also include other vehicles traveling around the vehicle 10. The object detector 13 tracks other detected objects and determines the trajectories and speeds of the other objects. In addition, the object detector 13 identifies the traveling lanes in which the other objects are traveling, based on the lane marking lines represented in the map information and the locations of the objects. The object detector 13 also outputs object detection information which includes information representing the types of other objects that were detected, information indicating their locations and speeds, and also information indicating their traveling lanes, to the traveling lane planning device 14, drive planning device 15, vehicle control device 16 and vehicle stop planning device 18, etc.

At a traveling lane-planning creation time set in a predetermined cycle, the traveling lane planning device 14 selects a traffic lane on the road on which the vehicle 10 is traveling, within the nearest driving zone (for example, 10 km) selected from the navigation route, based on the map information, the navigation route and surrounding environment information and the current location of the vehicle 10, and creates a traveling lane plan representing the scheduled traveling lane for traveling of the vehicle 10. The surrounding environment information includes the locations and speeds of other vehicles traveling around the vehicle 10. For example, the traveling lane planning device 14 creates a traveling lane plan for the vehicle 10 to travel on a traffic lane other than a passing traffic lane. Each time a traveling lane plan is created, the traveling lane planning device 14 outputs the traveling lane plan to the drive planning device 15.

At a driving plan creation time set with a predetermined cycle, the drive planning device 15 carries out driving plan processing in which it creates a driving plan representing the scheduled traveling trajectory of the vehicle 10 up until a predetermined time, based on the traveling lane plan, the map information, the current location of the vehicle 10, the surrounding environment information and the vehicle status information. The vehicle status information includes the current location of the vehicle 10, and the vehicle speed, acceleration and traveling direction. The driving plan is represented as a combination of the target location of the vehicle 10 and the target vehicle speed at the target location, at each time from the current time until the predetermined time. The cycle in which the driving plan is created is preferably shorter than the cycle in which the traveling lane plan is created. When it has been determined that there is no problem with the driver, the drive planning device 15 creates a driving plan within the limits given the state of the vehicle 10 as it travels. The state of the vehicle 10 as it travels may be its acceleration, deceleration, yaw rate (angular speed) and angular acceleration. The drive planning device 15 also creates a driving plan to maintain a spacing of at least a predetermined distance between the vehicle 10 and other objects (such as vehicles). The drive planning device 15 outputs the driving plan to the vehicle control device 16 for each driving plan generated.

The vehicle control device 16 controls each unit of the vehicle 10 based on the current location of the vehicle 10 and the vehicle speed and yaw rate, as well as on the driving plan generated by the drive planning device 15. For example, the vehicle control device 16 determines the steering angle, acceleration and angular acceleration of the vehicle 10 according to the driving plan and the speed and yaw rate of the vehicle 10, and sets the amount of steering, and the accelerator or brake level so as to match that steering angle, accelerator level and angular acceleration. The vehicle control device 16 also outputs a control signal corresponding to a set steering amount, to an actuator (not shown) that controls the steering wheel for the vehicle 10, via the in-vehicle network 19. The vehicle control device 16 also outputs a control signal corresponding to the set accelerator level, to a drive unit (including an engine or electric motor, not shown) of the engine of the vehicle 10, via the in-vehicle network 19. Alternatively, the vehicle control device 16 may output a control signal corresponding to a set brake level to the brake (not shown) of the vehicle 10, via the in-vehicle network 19.

The monitoring device 17 monitors the state of the driver and determines whether or not there is a problem with the driver. When it has determined that there is a problem with the driver, the monitoring device 17 outputs an abnormal signal representing that there is a problem with the driver, to the vehicle stop planning device 18, etc. The monitoring device 17 has a touch sensor 171 that detects when the driver is holding the steering wheel, and a torque sensor 172 that detects the torque of the steering wheel.

The monitoring device 17 determines whether or not the driver has poor posture, based on a monitor image. The monitoring device 17 has a classifier that has been trained to classify postures, such as a prostrate, down-facing, leaning back, curled, sideways-neck, lying down or side-supporting posture. The monitoring device 17 inputs monitor images into the classifier to discriminate whether the driver is in a down-facing, leaning back, curled, sideways-neck, lying down or side-supporting posture. When the posture of the driver has been discriminated as down-facing, leaning back, curled, sideways-neck, lying down or side-supporting, the monitoring device 17 determines that the driver has a poor posture. When the driver continuous to have a state of poor posture for a predetermined time, the monitoring device 17 determines that the level of active driving by the driver is low.

The classifier is a deep neural network (DNN) having multiple layers connected in series from the input end to the output end, for example. Images containing down-facing, leaning back, curled, sideways-neck, lying down and side-supporting postures are input to the DNN beforehand as teacher data for training, and the DNN operates as a classifier to detect types of posture.

Based on monitor images, the monitoring device 17 also detects the driver's line of sight, the degree to which the eyes are open (hereunder also referred to as "degree of eye opening") and the degree to which the mouth is open (hereunder also referred to as "degree of mouth opening"), and determines the level of active driving by the driver, based on the detected line of sight, degree of eye opening and degree of mouth opening. When the line of sight is out of a predetermined range that includes the front of the vehicle 10, the monitoring device 17 determines that the level of active driving by the driver is low. When the degree of eye opening is less than a predetermined reference value for the degree of eye opening or the degree of mouth opening is greater than a predetermined reference value for the degree of mouth opening, the monitoring device 17 likewise determines that the level of active driving by the driver is low. On the other hand, when the line of sight is within a predetermined range including the front of the vehicle 10, or the degree of eye opening is greater than a predetermined reference value for the degree of eye opening, or the degree of mouth opening is less than a predetermined reference value for the degree of mouth opening, the monitoring device 17 determines that the level of active driving by the driver is high.

The monitoring device 17 also determines that the level of active driving by the driver is low when operation of the steering by the driver is not detected by the torque sensor 172 during a predetermined monitoring time.

When it has been determined that the level of active driving by the driver is low, the monitoring device 17 alerts the driver through the UI 6 to recommend active operation the vehicle.

If, within a predetermined time after having alerted the driver, it has been determined that the driver does not have poor posture, the monitoring device 17 determines that the driver is actively driving.

If, within a predetermined time after having alerted the driver, it has been determined that the level of active driving by the driver is high based on the detected line-of-sight direction, degree of eye opening and degree of mouth opening, the monitoring device 17 determines that the driver is actively driving the vehicle.

If, within a predetermined time after having alerted the driver, the touch sensor 171 has detected that the driver is holding the steering wheel, or the torque sensor 172 has detected operation of the steering wheel by the driver, the monitoring device 17 determines that the driver is actively driving the vehicle.

If, within a predetermined time after having alerted the driver, operation of the accelerator pedal or brake pedal (not shown) by the driver has been detected, the monitoring device 17 determines that the driver is actively driving the vehicle.

If, within a predetermined time after having alerted the driver, it has not been determined that the driver is actively driving, it is determined that there is a problem with the driver. The monitoring device 17 then generates an abnormal signal indicating that there is a problem with the driver. This is only one example of generating an abnormal signal, and the monitoring device 17 may use another method to determine whether or not an abnormal signal is to be generated. Moreover, in the example described above, a single alert is sent to the driver before generating the abnormal signal, but the monitoring device 17 may generate the abnormal signal after sending multiple alerts or may generate the abnormal signal without sending an alert. The monitoring device 17 outputs the abnormal signal to the vehicle stop planning device 18.

The vehicle stop planning device 18 carries out assessment processing and setting processing. The vehicle stop planning device 18 comprises a communication interface (IF) 21, a memory 22 and a processor 23 for this purpose. The communication interface 21, memory 22 and processor 23 are connected via signal wires 24. The communication interface 21 has an interface circuit to connect the vehicle stop planning device 18 with the in-vehicle network 19.

The memory 22 is an example of a memory unit, and it has a volatile semiconductor memory and a non-volatile semiconductor memory, for example. The memory 22 stores an application computer program and various data to be used for information processing carried out by the processor.

All or some of the functions of the vehicle stop planning device 18 are functional modules driven by a computer program operating on the processor 23, for example. The processor 23 has a determining unit 231 and a setting unit 232. Alternatively, the functional module of the processor 23 may be a specialized computing circuit in the processor 23. The processor 23 comprises one or more CPUs (Central Processing Units) and their peripheral circuits. The processor 23 may also have other computing circuits such as a logical operation unit, numerical calculation unit or graphic processing unit. Other operations carried out by the vehicle stop planning device 18 are described below.

The map information storage device 11, location estimating device 12, object detector 13, traveling lane planning device 14, drive planning device 15, vehicle control device 16, monitoring device 17 and vehicle stop planning device 18 are electronic control units (ECU), for example. For FIG. 2, the map information storage device 11, location estimating device 12, object detector 13, traveling lane planning device 14, drive planning device 15, vehicle control device 16, monitoring device 17 and vehicle stop planning device 18 were explained as separate devices, but all or some of them may be constructed in a single device.

Figure 3:
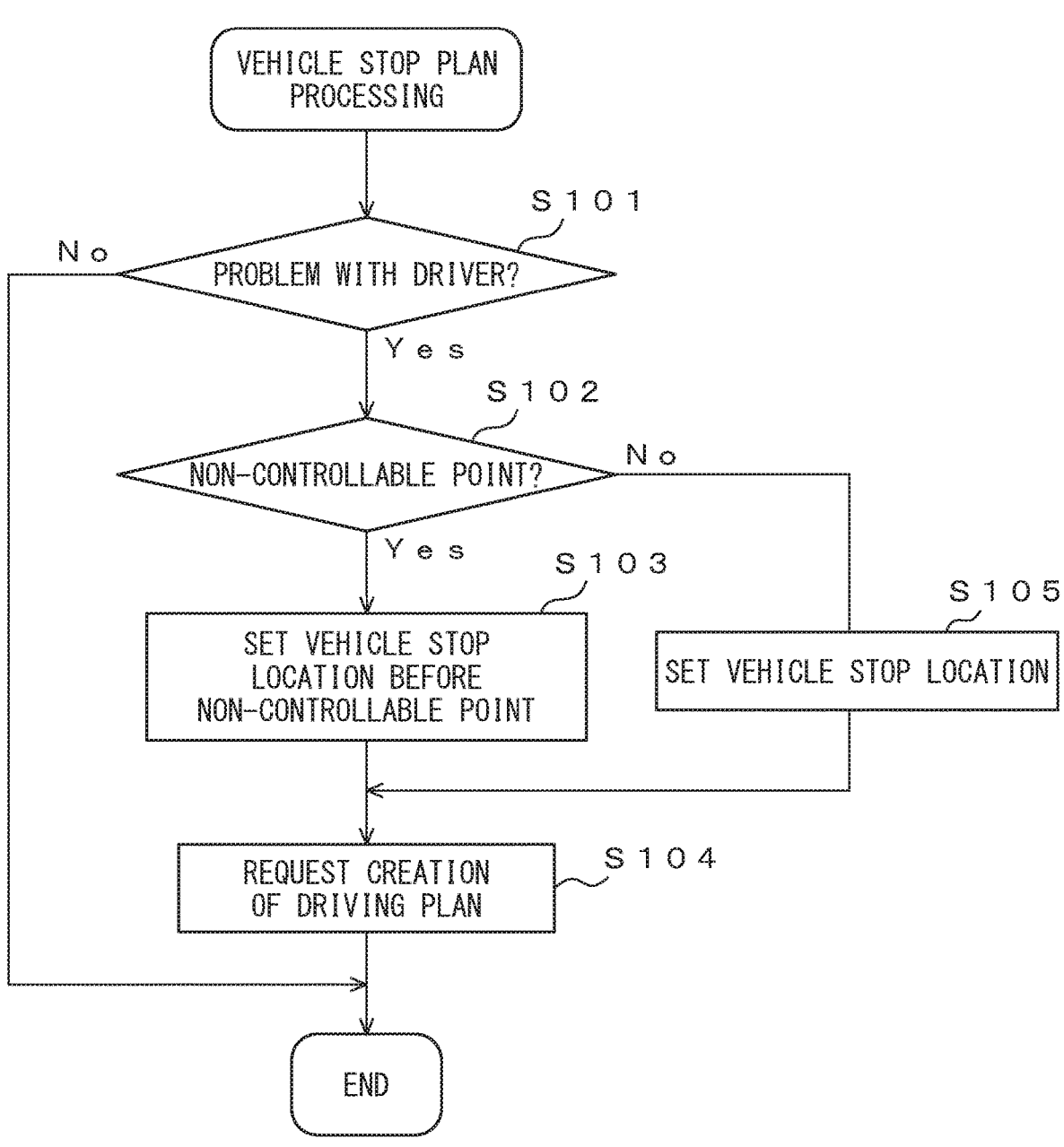
FIG. 3 is an example of an operation flow chart for vehicle stop plan processing by the vehicle stopping device of the embodiment.

FIG. 3 is an example of an operation flow chart for vehicle stop plan processing by the vehicle stopping device 18 of the embodiment. Vehicle stop plan processing by the vehicle stopping device 18 will be described below with reference to FIG. 3. The vehicle control device 16 carries out vehicle stop plan processing according to the operation flow chart shown in FIG. 3, at a vehicle stop plan time having a predetermined cycle.

First, the determining unit 231 determines whether or not there is a problem with the driver (step S101). The determining unit 231 determines that there is a problem with the driver when an abnormal signal has been input from the monitoring device 17. On the other hand, the determining unit 231 determines that there is no problem with the driver when an abnormal signal has not been input from the monitoring device 17.

When there is a problem with the driver (step S101— Yes), the determining unit 231 determines whether or not a non-controllable point where automatic control of traveling of the vehicle 10 is not allowed exists in a predetermined range from the current location of the vehicle on the path ahead of the vehicle 10. The determining unit 231 determines whether or not a non-controllable point exists in the predetermined range from the current location of the vehicle on the path ahead of the vehicle 10, based on the current location of the vehicle 10, the navigation route and the map information.

The non-controllable point may be a point that is curved with a smaller curvature radius than a predetermined reference curvature radius, a point having a larger gradient than a predetermined reference gradient, an intersection, a stop line, a point where the number of traffic lanes is reduced, the end of the high precision map, or a region where the high precision map is not available (a high-speed road exit, a motorway toll gate, a motorway service area or a parking area, for example). Non-controllable points also include non-matching points where the map information differs from the actual road information.

Control of operation of the vehicle 10 has an automatic control mode in which control is mainly by the automatic control system 1, and manual control mode in which control is mainly by the driver. In automatic control mode, one or more operations from among steering, acceleration and braking are controlled mainly by the automatic control system 1. In manual control mode, on the other hand, steering, acceleration and braking are all controlled mainly by the driver. Operation of the vehicle 10 in automatic control mode is not allowed at non-controllable points.

When there is a problem with the driver, the predetermined range is determined based on the allowable distance for vehicle 10 travel, as soon as possible when the vehicle 10 is stopped. The predetermined range may be a distance represented by the product of the most recent average speed of the vehicle 10 and a predetermined time, for example.

When a non-controllable point exists (step S102—Yes), the setting unit 232 sets a vehicle stop location where the vehicle 10 can stop, at a location before the non-controllable point, from the current location of the vehicle 10 in the forward direction of the vehicle 10 (step S103). Vehicle stop location processing by the setting unit 232 will be described in detail below.

The setting unit 232 then notifies the drive planning device 15 of a request to create a driving plan to stop the vehicle 10 at the vehicle stopping location (step S104), and the series of processing steps is complete.

When a non-controllable point does not exist (step S102—No), on the other hand, the setting unit 232 sets a vehicle stop location where the vehicle 10 can stop, within a predetermined reference distance from the current location of the vehicle 10 in the forward direction of the vehicle 10 (step S103). The predetermined reference distance is set so as to satisfy the limit for the state of the vehicle 10 as it travels which is allowed when it has been determined that there is no problem with the driver. For example, the reference distance is determined so that the vehicle 10 does not undergo deceleration beyond a reference value. The reference distance can be determined based on the distance represented by the product between the most recent average speed of the vehicle 10 and a predetermined time, and on the deceleration allowed for deceleration of the vehicle 10. The reference distance can also be determined so that deceleration produced by the vehicle 10 when it stops at the vehicle stop location does not create an undue burden on the driver.

The setting unit 232 then notifies the drive planning device 15 of a request to create a driving plan to stop the vehicle 10 at the vehicle stopping location (step S104), and the series of processing steps is complete. When there is no problem with the driver (step S101—No), the series of processing steps is likewise complete.

Figure 4:
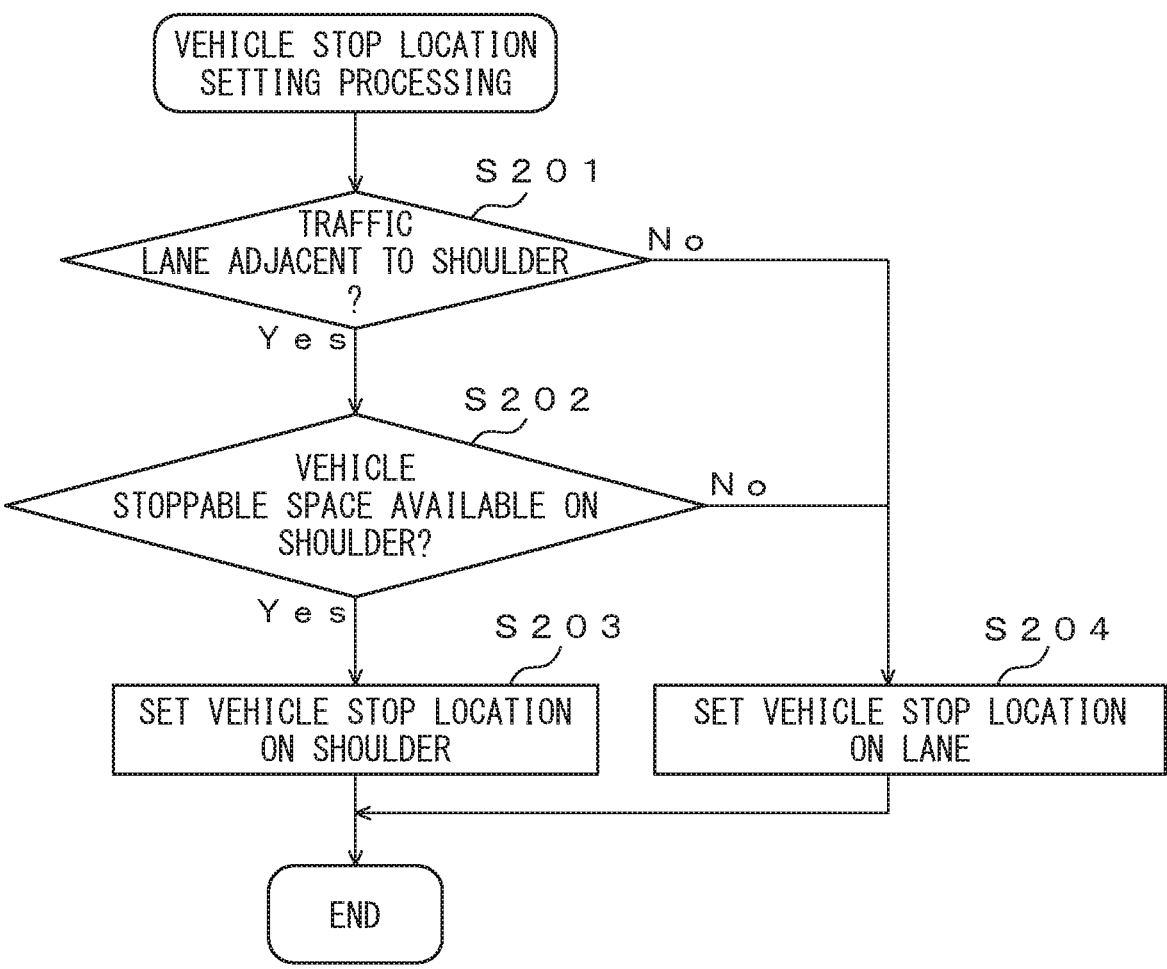
FIG. 4 is an example of an operation flow chart for vehicle stop location setting processing by the vehicle stopping device of the embodiment.

Processing by which the setting unit 232 carries out vehicle stop location processing in step S103 will now be described with reference to FIG. 4.

First, the setting unit 232 determines whether or not the vehicle 10 is traveling in a traffic lane bordering a shoulder, based on the current location of the vehicle 10 and on map information (step S201).

When the vehicle 10 is traveling on a lane adjacent to a shoulder (step S201—Yes), the setting unit 232 determines whether or not a location exists where the vehicle 10 can be stopped on the shoulder adjacent to the lane on which the vehicle 10 is traveling (step S202). Based on object detection information and map information, the setting unit 232 detects a space on the shoulder between the current location of the vehicle 10 and the non-controllable point, where it is possible to stop the vehicle 10. When a space has been detected on the shoulder where the vehicle 10 can stop, the setting unit 232 determines that a location exists on the shoulder where the vehicle 10 is able to stop.

The setting unit 232 therefore detects a space where the vehicle 10 can stop, allowing the limit for the state of the vehicle 10 as it travels from the current location of the vehicle 10 to the space where the vehicle 10 is able to stop, to exceed the limit allowed when it has been determined that there is no problem with the driver. For example, the setting unit 232 allows deceleration of the vehicle 10 beyond the deceleration allowed for the vehicle 10 when it has been determined that there is no problem with the driver. This is because the priority is to stop the vehicle 10 at a location before the non-controllable point, even if the deceleration produced by the vehicle 10 until it stops at the vehicle stop location is slightly burdensome for the driver. The deceleration of the vehicle 10 until it stops at the vehicle stop location is estimated based on the distance from the current location of the vehicle 10 to the space where the vehicle 10 can stop, and the time required for the vehicle 10 to stop. The setting unit 232 calculates a deceleration producing a change in time required for the vehicle 10 to stop, and detects a space that satisfies the criteria for the relaxed deceleration. For example, the upper limit for the deceleration may be relaxed to 1.3 to 1.5 times the deceleration allowed when it has been determined that there is no problem with the driver.

When the setting unit 232 cannot detect a space where the vehicle 10 can stop even after relaxing the limit on the state of the vehicle 10 as it travels, it determines that no location exists on the shoulder where the vehicle 10 is able to stop. The setting unit 232 also determines that no location exists on the shoulder where the vehicle 10 is able to stop if no space where the vehicle 10 can stop is detected due to reasons such as another vehicle being parked on the shoulder.

If a space where the vehicle 10 can stop exists on the shoulder (step S202—Yes), the setting unit 232 sets the vehicle stop location at that space on the shoulder (step S203), and the series of processing steps is complete.

If no space where the vehicle 10 can stop exists on the shoulder (step S202—No), on the other hand, the setting unit 232 detects a space where the vehicle 10 can stop on the traveling lane between the current location of the vehicle 10 and the non-controllable point, setting the vehicle stop location at that space (step S204), and the series of processing steps is complete. In this case as well, the setting unit 232 detects a space where the vehicle 10 can stop while allowing the limit for the state of the vehicle 10 to further exceed the limit allowed when it has been determined that there is no problem with the driver, as it travels from the current location of the vehicle 10 to the space where the vehicle 10 is able to stop. This is because, for example, the priority is to stop the vehicle 10 on the traveling lane before the non-controllable point, even if the deceleration produced by the vehicle 10 until it stops at the vehicle stop location is slightly burdensome for the driver.

An example of operating the vehicle 10 that is controlled based on the driving plan described above will now be explained with reference to FIG. 1.

An example of the vehicle 10 being automatically controlled, based on a driving plan for moving the vehicle 10 to the shoulder and stopping it, will now be explained using FIG. 1. First, at time T101, the vehicle 10 travels on the traffic lane 51 of the road 50 and the monitoring device 17 of the vehicle 10 determines that there is no problem with the driver.

Next, at time T102, since it has been determined by the monitoring device 17 that the level of active driving by the driver is low, it gives the driver an alert through the UI 6 to actively operate the vehicle. The monitoring device 17 also outputs a signal indicating a low level of active driving by the driver, to the drive planning device 15 via the in-vehicle network 19, and the drive planning device 15 initiates deceleration in response. The drive planning device 15 also flashes an emergency flash indicator if predetermined conditions are satisfied. This provides a warning to those around the vehicle 10 to be wary of the behavior of the vehicle 10.

Next, at time T103, the monitoring device 17 has not determined that the level of active driving by the driver is high, the touch sensor 171 has not detected that the driver is holding the steering wheel, the torque sensor 172 has not detected operation of the steering wheel by the driver and operation of the accelerator pedal or brake pedal by the driver has not been detected, within a predetermined time after having alerted the driver, and therefore an abnormal signal is generated indicating that there is a problem with the driver. The monitoring device 17 outputs the abnormal signal to the vehicle stop planning device 18, via the in-vehicle network 19. Since an abnormal signal has been input from the monitoring device 17, the vehicle stop planning device 18 determines that there is a problem with the driver.

Since a non-controllable point 60 exists in a predetermined range from the current location of the vehicle 10 on the path ahead of the vehicle 10, the vehicle stop planning device 18 sets a vehicle stop location P at a location on the shoulder before the non-controllable point 60. The drive planning device 15 creates a driving plan to stop the vehicle while it decelerates toward the vehicle stop location P.

When the vehicle 10 reaches a predetermined distance with respect to the vehicle stop location P on the shoulder 53 at time T104, the vehicle speed is decelerated to a predetermined speed. The vehicle 10 is caused to move to the shoulder 53 side and travel along the shoulder 53, in the traffic lane 51 in which it is traveling. For example, the drive planning device 15 creates a driving plan so that the vehicle 10 travels at a location separated by a predetermined distance from the lane marking line dividing the traffic lane and the shoulder. This allows other vehicles surrounding the vehicle 10 to be alerted that the vehicle 10 will move to the shoulder. The vehicle 10 flashes a direction indicator while traveling on the traffic lane 51 for a predetermined distance along the shoulder 53, toward a target location on the shoulder 53.

Next, at time T105, the vehicle 10 begins to move to the shoulder 53, toward the vehicle stop location P on the shoulder 53. The vehicle 10 enters the shoulder 53 from the traffic lane 51 on which it was traveling, while straddling the lane marking line 55.

Finally, at time T106, the vehicle 10 stops at the vehicle stop location P on the shoulder 53, and the emergency flash indicator of the vehicle begins to flash. When moving to the vehicle stop location P, the vehicle 10 may be automatically controlled for an emergency stop if an obstacle has been detected on the scheduled traveling trajectory.

Figure 5:
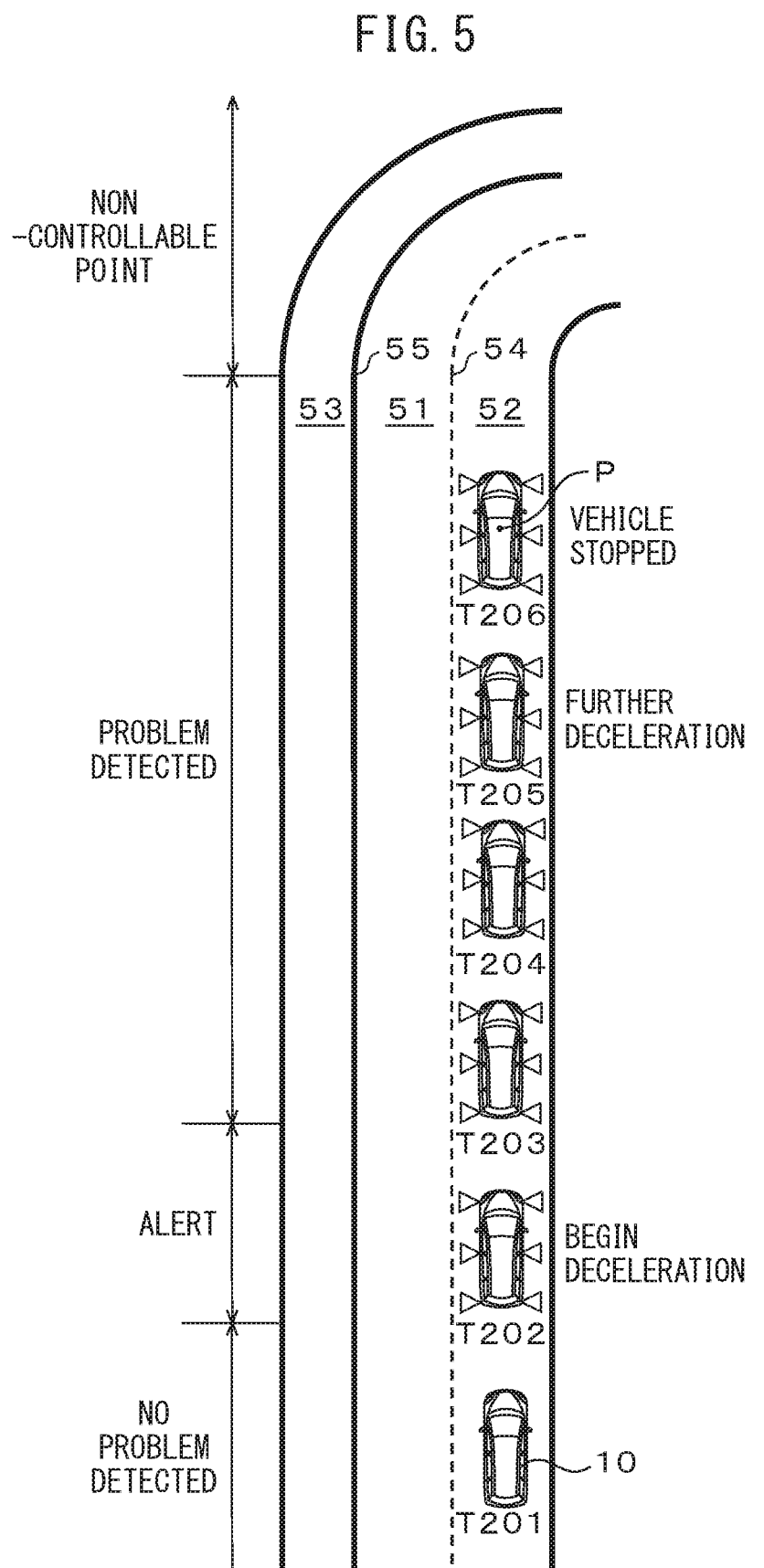
FIG. 5 is a diagram illustrating an example of operation of the vehicle stopping device of the embodiment.

An example of the vehicle 10 being automatically controlled, based a driving plan for stopping the vehicle 10 in the traffic lane in which the vehicle 10 is traveling, will now be explained using FIG. 5. Operation of the vehicle 10 at time T201 and time T202, and operation until the abnormal signal is output to the vehicle stop planning device 18 from the monitoring device 17 at time T203, are the same as shown for time T101 to time T103 in FIG. 1.

Since a non-controllable point 60 exists in a predetermined range from the current location of the vehicle 10 on the path ahead of the vehicle 10 at time T203, the vehicle stop planning device 18 sets a vehicle stop location P at a location before the non-controllable point 60. Since the lane 51 on which the vehicle 10 is traveling is not adjacent to the shoulder 53, the vehicle stop planning device 18 sets the vehicle stop location P on the lane 52 on which it is traveling. The drive planning device 15 creates a driving plan to stop the vehicle while it decelerates toward the vehicle stop location P. The drive planning device 15 creates a driving plan to stop the vehicle while it decelerates toward the vehicle stop location P.

Next, when the vehicle 10 reaches a predetermined distance from the vehicle stop location P on the traffic lane 51 at time T204 and time T205, it decelerates to a predetermined speed and moves on the traffic lane 51 toward the vehicle stop location P.

Finally, at time T206, the vehicle 10 stops at the vehicle stop location P on the traffic lane 51. The drive planning device 15 also continuously flashes the emergency flash indicator of the vehicle 10 during the period from time T202 to time T206.

As explained above, the vehicle stop planning device 18 can safely stop the vehicle 10 before the non-controllable point 60 when there is a problem with the driver.

The vehicle control device, the computer program for vehicle control and the method for controlling a vehicle according to the embodiment described above may incorporate appropriate modifications that are still within the gist of the disclosure. Moreover, the technical scope of the disclosure is not limited to these embodiments, and includes the invention and its equivalents as laid out in the Claims.

The invention claimed is:

1. An automatic control system for a host vehicle, the system comprising:
   a communication interface operatively connectable to:
      a driver monitoring device, the driver monitoring device including at least a camera;
      a vehicle control device that autonomously guides the vehicle during autonomous driving; and
      a drive planning device; and
   a processor operatively connected to the communication interface and programmed to:
      receive, via the communication interface, a signal from the driver monitoring device indicating a problem with a driver of the host vehicle;
      in response to receiving the signal indicating a problem with the driver, determine whether there is a non-controllable point ahead of the vehicle, the non-controllable point being a point along a route ahead of the host vehicle where autonomous driving is not permitted; and
      in response to a determination that a non-controllable point is ahead of the vehicle, set a vehicle stop point at a location on the route ahead of the host vehicle before the non-controllable point by:
         accessing, via the communication interface, a current location of the vehicle;
         based on the accessed current location of the host vehicle, determining if the host vehicle is traveling in a lane adjacent to a shoulder;
         in response to a determination that the host vehicle is traveling in a lane adjacent to a shoulder, determining whether there is vehicle-stoppable space available on the shoulder;
         in response to a determination that there is vehicle-stoppable space available on the shoulder setting the stop point at a location within the vehicle-stoppable space on the shoulder; and
         in response to a determination that the host vehicle is traveling in a lane not adjacent to a shoulder, setting the stop point at a location on the lane not adjacent to a shoulder;
      instruct, via the communication interface, the drive planning device to generate a route from the accessed current location of the vehicle to the set stop point;
      change a deceleration limit to allow for deceleration of the vehicle beyond a deceleration of the vehicle permitted by the deceleration limit when there has not been a signal received indicating a problem with the driver; and
      instruct, via the communication interface, the vehicle control device to autonomously guide the host vehicle along the generated route from the accessed current location of the vehicle to the set stop point.

2. The vehicle control device according to claim 1, wherein the non-controllable point includes a point that is curved with a smaller curvature radius than a predetermined reference curvature radius or a point having a larger gradient than a predetermined reference gradient.

3. The vehicle control device according to claim 1, wherein the signal indicating a problem with the driver is based on a monitor image from the camera representing an area near a driving seat of the vehicle.

4. A computer-readable, non-transitory storage medium storing a computer program for automatic control of a host vehicle, which causes a processor execute a process and the process comprising:
   receiving, via a communication interface, a signal from a driver monitoring device indicating a problem with a driver of the host vehicle, the driver monitoring device including at least a camera;
   in response to receiving the signal indicating a problem with the driver, determining whether there is a non-controllable point ahead of the vehicle, the non-controllable point being a point along a route ahead of the host vehicle where autonomous driving is not permitted; and
   in response to a determination that a non-controllable point is ahead of the vehicle, setting a vehicle stop point at a location on the route ahead of the host vehicle before the non-controllable point by:
      accessing, via the communication interface, a current location of the vehicle;

based on the accessed current location of the host vehicle, determining if the host vehicle is traveling in a lane adjacent to a shoulder;

in response to a determination that the host vehicle is traveling in a lane adjacent to a shoulder, determining whether there is vehicle-stoppable space available on the shoulder;

in response to a determination that there is vehicle-stoppable space available on the shoulder setting the stop point at a location within the vehicle-stoppable space on the shoulder; and in response to a determination that the host vehicle is traveling in a lane not adjacent to a shoulder, setting the stop point at a location on the lane not adjacent to a shoulder;

instructing, via the communication interface, the drive planning device to generate a route from the accessed current location of the vehicle to the set stop point;

changing a deceleration limit to allow for deceleration of the vehicle beyond a deceleration of the vehicle permitted by the deceleration limit when there has not been a signal received indicating a problem with the driver; and instructing, via the communication interface, a vehicle control device to autonomously guide the host vehicle along the generated route from the accessed current location of the vehicle to the set stop point.

5. A method for automatic control of a host vehicle, the method comprising:

receiving, via a communication interface, a signal from a driver monitoring device indicating a problem with a driver of the host vehicle, the driver monitoring device including at least a camera;

in response to receiving the signal indicating a problem with the driver, determining whether there is a non-controllable point ahead of the vehicle, the non-controllable point being a point along a route ahead of the host vehicle where autonomous driving is not permitted; and in response to a determination that a non-controllable point is ahead of the vehicle, setting a vehicle stop point at a location on the route ahead of the host vehicle before the non-controllable point by:

accessing, via the communication interface, a current location of the vehicle;

based on the accessed current location of the host vehicle, determining if the host vehicle is traveling in a lane adjacent to a shoulder;

in response to a determination that the host vehicle is traveling in a lane adjacent to a shoulder, determining whether there is vehicle-stoppable space available on the shoulder;

in response to a determination that there is vehicle-stoppable space available on the shoulder setting the stop point at a location within the vehicle-stoppable space on the shoulder; and in response to a determination that the host vehicle is traveling in a lane not adjacent to a shoulder, setting the stop point at a location on the lane not adjacent to a shoulder;

instructing, via the communication interface, the drive planning device to generate a route from the accessed current location of the vehicle to the set stop point;

changing a deceleration limit to allow for deceleration of the vehicle beyond a deceleration of the vehicle permitted by the deceleration limit when there has not been a signal received indicating a problem with the driver; and instructing, via the communication interface, a vehicle control device to autonomously guide the host vehicle along the generated route from the accessed current location of the vehicle to the set stop point.

* * * * *